(12) United States Patent
Hantschel et al.

(10) Patent No.: US 9,467,070 B2
(45) Date of Patent: Oct. 11, 2016

(54) DECENTRALIZED POWER GENERATION PLANT HAVING A DEVICE AND METHOD FOR DETECTING AN ISLAND NETWORK

(71) Applicant: REFUSOL GmbH, Metzingen (DE)

(72) Inventors: Jochen Hantschel, Dettingen a.d. Erms (DE); Felix Martin, Tuebingen (DE)

(73) Assignee: AEI Power GmbH, Metzingen (DE)

( * ) Notice: Subject to any disclaimer, the term of this patent is extended or adjusted under 35 U.S.C. 154(b) by 391 days.

(21) Appl. No.: 14/347,345

(22) PCT Filed: Sep. 25, 2012

(86) PCT No.: PCT/EP2012/068813
§ 371 (c)(1),
(2) Date: May 28, 2014

(87) PCT Pub. No.: WO2013/045412
PCT Pub. Date: Apr. 4, 2013

(65) Prior Publication Data
US 2014/0254227 A1 Sep. 11, 2014

(30) Foreign Application Priority Data
Sep. 28, 2011 (DE) .................. 10 2011 054 002

(51) Int. Cl.
*H02M 7/537* (2006.01)
*H02M 7/5387* (2007.01)
*H02J 3/38* (2006.01)

(52) U.S. Cl.
CPC .......... *H02M 7/53875* (2013.01); *H02J 3/383* (2013.01); *H02J 2003/388* (2013.01); *Y02E 10/563* (2013.01)

(58) Field of Classification Search
CPC .......... H02M 7/00; H02M 7/42; H02M 7/48; H02M 7/53; H02M 7/537; H02M 7/5387; H02M 7/53871; H02M 7/53873; H02M 7/53875; H02M 7/487; G01R 21/00; G01R 31/00; G01R 31/40; G01R 31/42; H02J 3/38; H02J 3/383; H02J 2003/388; Y02E 10/56; Y02E 10/563; Y02E 10/58
USPC .......... 363/15–21.03, 34, 36, 40–43, 50, 363/55–58, 65, 71, 72, 95–99, 109, 363/131–134; 323/205–219, 222–226, 323/271–277, 282–285, 351, 906; 702/57–65, 108–112; 307/13, 14, 307/31–35, 82, 85–87, 125–131; 324/512, 324/521, 522–524; 361/20, 21, 18
See application file for complete search history.

(56) References Cited

U.S. PATENT DOCUMENTS

| | | | | |
|---|---|---|---|---|
| 6,219,623 | B1 * | 4/2001 | Wills | H02J 3/383 290/40 B |
| 6,603,290 | B2 * | 8/2003 | Hochgraf | H02J 3/38 307/32 |

(Continued)

FOREIGN PATENT DOCUMENTS

| | | |
|---|---|---|
| DE | 195 04 271 C1 | 2/1996 |
| EP | 1 808 947 A2 | 7/2007 |
| EP | 1 953 892 A2 | 8/2008 |

OTHER PUBLICATIONS

Office Action dated Jul. 26, 2012 issued in corresponding DE patent application No. 10 2011 054 002.4 (and partial English translation).

(Continued)

*Primary Examiner* — Timothy J Dole
*Assistant Examiner* — Carlos Rivera-Perez
(74) *Attorney, Agent, or Firm* — Posz Law Group, PLC (57) ABSTRACT

The invention relates to a device and to a method for monitoring a decentralized power generation plant for feeding into a three-phase network in order to prevent undesired island network operation, wherein the power generation plant has an inverter, which produces three alternating currents phase-shifted from each other from an input-side direct voltage, in particular of a photovoltaic generator, which alternating currents are fed into the network. The basis of the monitoring method is that the target power value for a designated phase of the network alternating voltage is changed, e.g. reduced, by a predetermined first amount for a predetermined time period while the target power values for the other two phases are changed in the opposite direction, e.g. increased, by a predetermined second and/or third amount. The sum of the second and third amounts equals the first amount.

20 Claims, 5 Drawing Sheets

(56) References Cited

U.S. PATENT DOCUMENTS

| | | | |
|---|---|---|---|
| 2006/0004531 A1 | 1/2006 | Ye et al. | |
| 2007/0179724 A1* | 8/2007 | Mabuchi | H02J 3/383 702/60 |
| 2008/0179966 A1* | 7/2008 | Horio | H02J 3/38 307/126 |
| 2011/0043160 A1* | 2/2011 | Serban | G05F 1/67 320/101 |

OTHER PUBLICATIONS

International Search Report of the International Searching Authority mailed Aug. 9, 2013 in the corresponding International patent application No. PCT/EP2012/068813.

Written Opinion of the International Searching Authority dated Mar. 28, 2014 issued in the corresponding International patent application No. PCT/EP2012/068813 (English translation only).

* cited by examiner

DECENTRALIZED POWER GENERATION PLANT HAVING A DEVICE AND METHOD FOR DETECTING AN ISLAND NETWORK

CROSS REFERENCE TO RELATED APPLICATIONS

This application is a U.S. national stage application of International Patent Application No. PCT/EP2012/068813 filed on Sep. 25, 2012, and claims priority to, and incorporates by reference, German Patent Application No. 10 2011 054 002.4 filed on Sep. 28, 2011.

The present invention relates to a method for monitoring a decentralized power generation plant for detecting an island network, and to a decentralized power generation plant comprising such a monitoring device.

Decentralized power generation plants are used increasingly for feeding power into a public or private supply grid or for feeding electrical consumers. For this, different plants, such as photovoltaic systems, fuel cell systems or the like, are known which use inverters in order to convert a DC power available on the input side into an output-side AC power. In the case of coupling to the grid, the inverters in this case operate on the output side phase-synchronously with respect to the grid, with the result that they generate an AC voltage corresponding to the frequency and amplitude of the mains voltage and an alternating current which is synchronous therewith.

In order to avoid continued feeding by the inverter and risks associated therewith in the event of a grid failure, for example interference on the grid or an intentional grid shutdown, for example for the purpose of conducting work on the grid, in accordance with the regulations a device for grid monitoring needs to be provided which identifies a grid failure by measuring operational parameters and thereupon effects automatic disconnection of the power generation plant from the grid. Conventionally the voltage and frequency of the mains voltage are often used as measurement parameters.

In the case of a method referred to as three-phase mains voltage monitoring, for example the amplitudes and frequencies of the phase-to-phase voltages of the three outer conductors of a three-phase mains voltage are monitored for grid failure identification. In the event of discrepancies between the voltage and/or frequency for the respective rated value for the mains voltage amounting to a maximum limit value, the power generation plant is disconnected from the grid within a prescribed time.

Although this method is very simple to implement and is in principle suitable, in specific cases problems may arise in the identification of a grid failure. If, for example, an equilibrium is established between the power generated by the power generation plant and the power drawn by local loads, this does not result in a change in the monitored parameters of voltage and frequency after failure or shutdown of the grid. Owing to the power equilibrium, there is no usable shutdown criterion, with the result that the plant does not shut down. Therefore, a voltage continues to be present on the grid even after grid failure, which is also referred to as so-called unintentional island grid operation. This can represent a risk to maintenance personnel, for example, because, in a shut-down grid section, there is now no safe isolation from the supply, which is a different state than is expected. It is necessary to ensure that even in the case of a power equilibrium after shutdown of the grid, the power generation plant is safely disconnected from the grid.

The German draft standard VDE 0126 provides, for testing for shutdown as a result of unintentional island grid operation, a test circuit which simulates a balanced feed and load state and voltage and frequency stabilization conditions of a grid region which can form a grid island by means of interruption. For this purpose, the DC voltage side of the inverter is supplied via a regulatable power source, while resistors, induction coils and capacitors are connected in parallel with the output on the AC voltage side, which resistors, inductor coils and capacitors can form an RLC resonant circuit and be matched finely to the generated active and reactive powers. The RLC resonant circuit is set so as to load the inverter in such a way that no power is output to the grid. In order to test a three-phase arrangement, the test circuit is connected successively to in each case at least one of the outer conductors, while the other outer conductor(s) are connected directly to the grid. The disconnections need to take place in each case within a predetermined maximum time period, approximately 0.2 second, after disconnection from the grid. If the inverter is loaded with such a balanced RLC resonant circuit, a grid failure on its own cannot be safely identified by means of voltage and frequency monitoring without suitable additional measures.

The method of mains impedance measurement has been proposed as a suitable measure. In this case, grid quantities, such as voltage and/or current, are actively influenced by a measuring device or by the inverter itself, wherein the mains impedance is derived from the influencing. For example, a constant current value can be applied as a pulse to the grid in the region of the zero crossing of the AC mains voltage by the measuring device. The voltage which is required for impressing a constant current during such a zero crossing is a measure of the mains impedance which can then be calculated. Instead of a pulse at the zero crossing of the AC mains voltage, it is also possible for a harmonic to be modulated onto said AC mains voltage. In any case, the mains impedance can be determined and compared with permissible limit values. The draft standard VDE 0126 regards the mains impedance measurement as a reliable method for preventing unintentional island grid operation and cites limit values for the mains impedance and for sudden changes in impedance.

However, the grid impendence measurement method also has disadvantages. For example, the harmonic content of the mains voltage is increased by the connection of the current pulses or signals, which is not tolerated to an unlimited extent by power supply companies. In addition, a plurality of inverters in a common supply region which operate on the basis of the principle of impedance measurement can influence one another if no complex synchronization is provided.

Other methods for identifying a grid failure have also been proposed. In a method known from practice, a capacitive response is impressed on the inverter, for example, by virtue of a shift in the phase angle of the output-side alternating current with respect to the AC voltage being preset. Since the capacitance of the inverter is now in series with the capacitance of, for example, a balanced load, for example the balanced RLC resonant circuit in the case of testing in accordance with VDE 0126, as a result the fundamental of the LC parallel resonant circuit is changed, with the result that said LC parallel resonant circuit can no longer precisely hold the frequency of the grid in the event of a grid failure. This results in a change in the phase angle of the individual outer conductor voltages (i.e. the phasors of the outer conductor voltages diverge in the phasor diagram), which can then be identified as unintentional island grid operation.

Owing to the phase shift between the current and the voltage which is impressed for a short period of time, however, the power factor cos φ, which identifies the ratio of the absolute value of the active power to the reactive power, is reduced, however. The efficiency is reduced, and the proportion of reactive power increases, which is undesirable for power supply companies. If possible, a power factor cos φ equal to one is desirable.

In the case of another known method, the output power of the inverter is changed for a short period of time for detecting an island network. If the grid is connected, said grid also keeps the amplitude of the mains voltage stable in this case. In the case of a grid failure, however, the mains amplitude changes, which can be identified as island grid operation.

One disadvantage here consists in that, in the event of a change in the output power of the inverter, its input power also changes. In the case of a photovoltaic system, the operating point of the photovoltaic generator is thus unfavorably influenced, for example. In a photovoltaic system, a specific regulator device sets the operating point of a photovoltaic generator during operation always in power-optimized fashion such that the generator always outputs the greatest possible power according to the instantaneous incident radiation conditions. (This operating point with the instantaneously greatest power output is referred to as the maximum power point (MPP) and the regulator device is referred to as MPP tracker.) If, as a result of the short-term change in the output power, the input power of the inverter changes, the MPP is departed from on the characteristic of the photovoltaic generator. As a result, the efficiency is impaired. In addition, the flicker component on the grid increases.

Against this background, the objective of the invention consists in eliminating the above deficiencies and proposing measures for safe identification of a grid failure for a decentralized power generation plant. In particular, an objective of the invention consists in providing a method for monitoring a decentralized power generation plant for feeding into a grid and a decentralized power generation plant comprising an associated monitoring device, which enable safe identification of the grid failure even in the case of an equilibrium between the power generated by the plant and the power drawn by local loads, such as, for example, in the case of the resonant circuit testing using a balanced RLC resonant circuit proposed by the draft standard VDE 0126. Advantageously, the identification of the grid failure without any losses in efficiency should be made possible. In addition, in the case of use on a photovoltaic system, a departure from the optimum MPP of the photovoltaic generator should be avoided.

These objectives are achieved according to the invention by the method having the features of claim 1 and the power generation plant according to claim 16.

The method according to the invention is intended for monitoring a decentralized power generation plant for feeding into a three-phase grid comprising an inverter, which generates three alternating currents which are phase-shifted with respect to one another from an input-side DC voltage, which alternating currents are fed into the grid. The method comprises the following steps: a) generating a setpoint power value for each phase of the AC mains voltage, with the result that each generated alternating current is matched to the amplitude, frequency and phase angle of a respective phase of the AC mains voltage; b) changing the setpoint power value for a certain phase of the AC mains voltage by a predetermined first magnitude in a predetermined time period; c) changing, in the reverse direction, the setpoint power value for at least one of the other phases of the AC mains voltage by a predetermined second and/or third magnitude in the same time period, wherein the sum of the second magnitude and the third magnitude is equal to the first magnitude; d) generating the alternating currents by means of the inverter on the basis of the changed setpoint power values; e) measuring the amplitude of the at least one certain phase of the AC mains voltage in the predetermined time period; and f) ascertaining if the measured amplitude of at least the one certain phase of the AC mains voltage changes by more than a maximum permissible quantity.

Therefore, the invention begins with the method for active power modification in which the output power of the inverter is changed for a short period of time for the identification of an unintentional island grid operation. For this purpose, the invention reduces or increases the setpoint power value, i.e. the setpoint value of the power being fed in, for a certain phase of the AC mains voltage, for example L1, by a predetermined first magnitude within a predetermined time period. The reduction or increase in the alternating power at the output for one phase, for example L1, is compensated for, however, by a corresponding increase or reduction in the output power at at least one of the other phases, for example L2 and/or L3. For this purpose, the setpoint power value for either the second phase, for example L2, and/or the third phase, for example L3, of the AC mains voltage is changed simultaneously in the reverse direction in such a way that, in terms of absolute value, the sum of the second or third magnitude corresponds to the first magnitude. If, for example, the setpoint power value for the phase L1 is reduced by 2%, the setpoint power values for the phase L2 and/or L3 are increased together by 2%.

The output power of the inverter, summed over all phases, consequently remains the same. As a result, the input power of the inverter does not change either, with the result that a largely constant power is drawn from a DC voltage source, for example a photovoltaic generator. In particular, the operating point of a photovoltaic generator, for example, is not changed and its optimum operating point (MPP) is not departed from. Using the principle of active power modification as a basis, a grid failure is always safely identified by the invention, even in the case of an equilibrium between the generated power and the power drawn by local loads. Only in the event of a grid failure would the amplitude of the AC mains voltage of at least the one certain phase change such that this would be identified and the plant would be shut down.

In accordance with a preferred application, the power generation plant is a photovoltaic system, which comprises a photovoltaic generator, which supplies the DC voltage input power for the inverter. In this case, the photovoltaic generator is preferably operated at its individual maximum power point (MPP) in order to provide the maximum DC voltage input power for the inverter given the current environmental and operational parameters and thus enable the actual greatest power output. In the event of the identification of the grid failure in accordance with the invention, the inverter can continue to be regulated at the MPP.

For example, in one embodiment, an MPP tracker can determine a setpoint voltage value characterizing the respective MPP and transfer it to a voltage regulator. Said voltage regulator then adjusts the input voltage of the inverter to the required value and presets a setpoint power value to a downstream AC regulator in order to keep the input voltage constantly at the setpoint voltage value. The AC regulator adjusts the alternating current to the required value in order to obtain the preset setpoint power value. An actuation device actuates, for example, switching elements of the inverter in a suitable manner in order to achieve the alternating current preset by the current regulator.

In general, the power available is distributed uniformly among all phases of the mains voltage. That is to say that the setpoint power value per phase substantially corresponds to a third of the total setpoint power value preset by the voltage regulator. Taking into consideration the current actual values for the respective phase voltages, the respective AC setpoint values for all phases can be determined precisely. Even if the amplitudes of the individual phase voltages are slightly different from one another, the power withdrawal from the generator is largely constant.

In a modified embodiment of the invention, the setpoint AC value per phase is determined under the simplifying assumption that the amplitudes of the phase voltages are equal to one another and correspond to the rated value, for example. That is to say that the current actual phase voltage values are not taken into consideration here. In this case, the setpoint AC value can be preset directly instead of the setpoint power value for the respective phase and can be changed corresponding to the method according to the invention for detecting an island network such that the complexity is reduced. It goes without saying that, in such a case, the term "setpoint power value" corresponds to a "setpoint current value" in steps a) to f) of the method according to the invention.

In a preferred embodiment, in step b) of the method according to the invention, the setpoint power value (or setpoint current value) for the one certain phase of the AC mains voltage is reduced, while, in step c), the setpoint power value (or setpoint current value) for at least one of the other phases of the AC mains voltage is increased. However, a reverse procedure with an increase in the setpoint power value for the one certain phase is also possible.

In a preferred embodiment, the setpoint power values (or setpoint current values) for the other two phases are changed equivalently. That is to say that the second and the third magnitude are equal and in each case amount to half the absolute value of the first magnitude. If, for example, the first magnitude is 2%, the second and third magnitudes will in each case be 1%. This has the advantage that the unbalanced loads are distributed uniformly among the two other phases. The output powers of the second and third phases are close to the rated power, which results in little influencing of the grid, for example low flicker generation.

In another advantageous embodiment of the invention, the setpoint power value (or setpoint current value) is changed only for one of the other two phases by a corresponding magnitude, which is equal to the first magnitude. For example, the setpoint power value for the second phase is increased by 2% if the setpoint power value for the first phase is reduced by 2%. The setpoint power value for the third phase remains unchanged. It is possible to at the same time implement a measurement for the two phases with a changed setpoint power value. Although the discrepancy with respect to the rated power is then greater for these phases, the frequency of the measurements is reduced, with the result that the times at which an unbalanced load occurs for a phase become less frequent.

The predetermined time period can preferably correspond to a period of the AC mains voltage. This enables simple current regulation with reduced sudden changes in current, in particular when the beginning of the predetermined time period is synchronized with the zero crossing of the one certain phase of the AC mains voltage. A period of the AC mains voltage is sufficient for the amplitude of the mains voltage on the respective phase to change sufficiently to be identified as a grid failure.

The maximum permissible quantity for the change in amplitude of at least the one certain phase of the AC mains voltage is selected in a suitable manner in order to enable safe identification of the grid failure within the predetermined time period. Preferably, the maximum permissible quantity approximately corresponds to the first magnitude of the change in the setpoint power value for the one certain phase. In a preferred embodiment, the maximum permissible change in the amplitude and the first magnitude are both approximately 2%.

In an embodiment of the invention, in the case where the change in the measured amplitude of the AC mains voltage for the one certain phase exceeds the maximum permissible quantity, the power generation plant is automatically disconnected from the grid. The method can be implemented relatively quickly, wherein the preset values for the first magnitude and the maximum permissible quantity of the change in the mains voltage can possibly be increased to approximately 4%, for example, for safe identification of the grid failure.

In a preferred alternative embodiment of the method, initially a first run with steps a) to f) with reduced preset values for the first magnitude and the maximum permissible quantity of, for example, only 2% is implemented. If it is ascertained that the maximum permissible quantity has been exceeded by the change in mains voltage, this is interpreted as a given probability of a grid failure (referred to below as "suspicion"), and steps a) to f) are repeated after a further time period with increased values for the predetermined first magnitude and the maximum permissible quantity of, for example, 4%. If the change in the mains voltage for the one certain phase now exceeds this increased maximum permissible quantity, this is finally ascertained as grid failure, and the plant is automatically disconnected from the grid. Advantageously, the current is reduced only slightly during the first run of the method, which results in small discrepancies with respect to the rated powers on the individual phases and low flicker phenomena. Only in the event of "suspicion" is the run repeated with a greater change in current. Unbalanced loads and corresponding effects on the grid can thus be kept low.

The further time period can, as can also the predetermined time period, correspond to a period of the AC mains voltage. In addition, the increased values for the first magnitude and the maximum permissible quantity of the change in the mains voltage can at least approximately correspond to double the values during the first run.

The method according to the invention is preferably repeated periodically and alternately for each of the three phases of the AC mains voltage as the certain phase. For example, the method steps can be implemented during a period of the mains voltage (for example approximately 40 ms at a mains frequency of 50 Hz) for a first phase and if necessary verified after an evaluation and wait time, for example a further period of the mains voltage, with increased preset values. After a time span of ten periods (200 ms at a mains frequency of 50 Hz), for example, the method is then implemented for the second phase L2. After further, for example twenty periods (400 ms), the method is implemented for the third phase L3.

By virtue of the fact that each phase is checked individually, the grid failure can be safely identified even in the case of an only single-phase balanced load, for example in the case of a single-phase resonant-circuit load in accordance with the test proposal pursuant to the draft standard VDE 0126.

In accordance with a further aspect of the invention, a decentralized power generation plant for feeding into a three-phase grid, in particular a photovoltaic system for feeding into a public or private power supply grid, is provided, wherein the power generation plant has a three-phase inverter, which converts an input-side DC voltage, in particular from a photovoltaic generator, into three alternating currents which are phase-shifted with respect to one another and which are fed into the grid. The power generation plant according to the invention has a regulator device for regulating the power fed into the inverter to a current maximum power value, a sensor device for capturing operational parameters of the plant, a disconnecting device for, if necessary, disconnecting and connecting the plant from and to the grid, and a control device for controlling the operation of the inverter, wherein the control device is in communication with or operatively connected to the regulator device, the sensor device and the disconnecting device and has control logic for implementing the above-described method for monitoring the plant for identification of a grid failure. As soon as the control device identifies a grid failure or an unintentional island grid operation, said control device causes the disconnecting device to disconnect the power generation plant from the grid safely with galvanic isolation. The advantages of the monitoring method according to the invention benefit the power generation plant to the same degree. In order to avoid repetition, reference is made to the above description in relation to possible embodiments and advantages of these embodiments.

Further details of advantageous embodiments of the invention are the subject matter of the drawing, the description and the patent claims.

The drawing illustrates embodiments of the invention, but the drawing is merely used for illustrating the principles of the invention and does not restrict the invention in any way. In the drawing.

Figure 1:
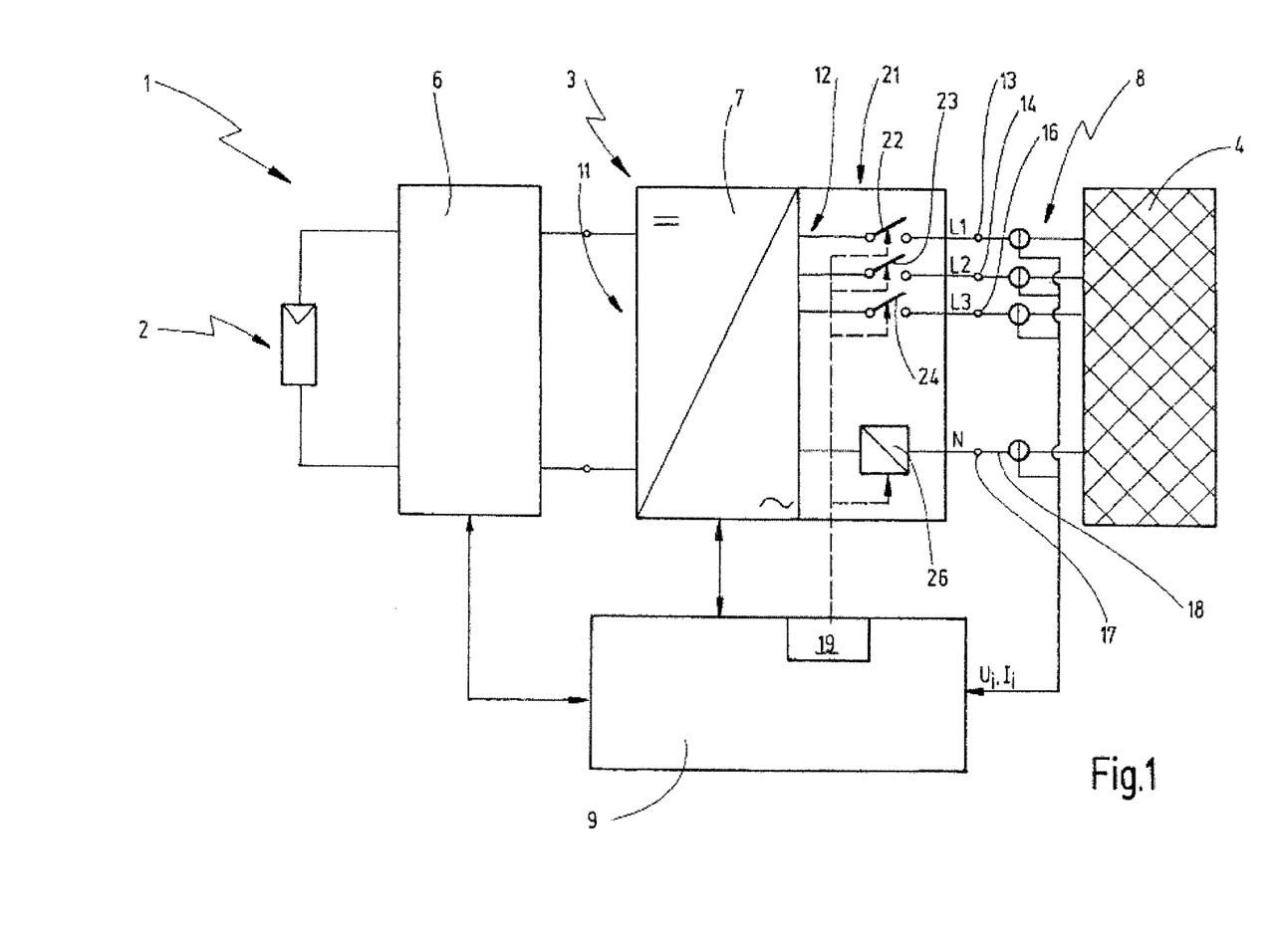
FIG. 1 shows a block circuit diagram of a power generation plant according to the invention comprising a monitoring device for detecting an island network, in a very simplified illustration.

FIG. 1 illustrates a very schematized illustration of a power generation plant 1 according to the invention which is used for generating an alternating current from a regenerative power source, which alternating current is fed into a grid. In the present case and in accordance with a preferred application, the power generation plant 1 according to the invention is a decentralized photovoltaic system which converts the solar power captured by a photovoltaic generator 2 and converted into DC electrical power into AC power appropriate for feeding into a grid 4 by means of an inverter arrangement 3. In this case, the photovoltaic generator 2 is illustrated only symbolically and can have an arrangement of individual photovoltaic modules. The grid 4 can be a public grid of an power supply company or a private grid which contains a plurality of connected consumers, for example.

The inverter arrangement 3 has in principle a conventional design comprising components or assemblies and functions which make it possible to convert the DC voltage provided on the input side by the photovoltaic generator 2 and the direct current into AC voltage and alternating current, which are matched to the AC voltage of the connected grid 4 with respect to amplitude, frequency and phase. In respect of the present invention, the description of the design of the inverter arrangement 3 can be substantially reduced to the fact that the inverter arrangement 3 comprises a regulator device 6 for regulating the power drawn from the photovoltaic generator 2, an inverter 7, a sensor device 8, which captures environmental and operational parameters of the power generation plant 1, and a control device 9, which receives parameter values captured by the sensor device 8 and, on the basis of said values, monitors and controls the operation of the components, in particular of the inverter 7.

The regulator device 6 is connected downstream of the photovoltaic generator 2 and has a DC voltage converter or the like which performs the MPP tracking. MPP (Maximum Power Point) tracking is understood to mean the operation of the photovoltaic modules at their individual maximum power points in order to achieve an optimum power generation of the individual photovoltaic modules. The maximum power point (MPP) is dependent on the radiation intensity, the temperature and the type of photovoltaic cells. In order that the photovoltaic generator always operates at the MPP, the MPP tracker regulates the voltage to the required value, conventionally varies the DC voltage by a small absolute value, then determines in each case the product of the current and the voltage and adjusts the operating voltage towards a higher power. Thus, even in the case of changing radiation conditions, operation of the photovoltaic generator 2 at the MPP can always be ensured. The power drawn from the photovoltaic generator 2 is provided at the input 11 of the inverter 7.

The inverter 7 is a three-phase inverter, which performs the function of sinusoidal transformation of the DC voltage intermediate circuit power at its input or intermediate circuit 11 into the grid. The inverter 7 can have any desired configuration, as are generally known from the prior art. Preferably, the inverter 7 has an arrangement of switch elements that can be clocked at high frequencies, such as, for example, IGBT switches or the like, which are actuated, preferably pulse-width-modulated, with a predetermined pattern in order to generate alternating currents which are phase-shifted through 120° with respect to one another at the output 12 of the inverter 3, which alternating currents are synchronized with the individual phases L1, L2 and L3 of the mains voltage of the grid 4. The in this case four-pole output 12 of the inverter 7 has three output connections (L1, L2, L3) 13, 14, 16, which conduct the individual phases of the output-side AC voltage of the inverter 7 or the mains voltage, and a neutral output connection (N) 17, which can be connected on the grid side by means of a connection to ground to a defined zero potential.

The sensor device 8 has sensor means, such as current and voltage sensors, which make it possible to detect signals at different points in the power generation plant 1, in particular the inverter arrangement 3. The input voltage of the inverter, the phase currents $I_{L1}$, $I_{L2}$, $I_{L3}$ fed in via the respective output connections 13, 14 and 16, the amplitudes of the phases of the mains voltage $U_{L1}$, $U_{L2}$, $U_{L3}$, but also parameters which relate to, for example, the current environmental conditions, for example the radiation intensity and temperature at the photovoltaic generator, can be detected (not illustrated here). The sensor device 8 is connected to the control device 9 so as to enable communication and provides the captured measured values to said control device.

The control device 9 controls the operation in particular of the inverter 7 depending on signals provided by the sensor device 8. For this purpose, the control device 9 processes the received signals in accordance with predetermined logic rules in order to output output signals, for example for actuating the switch elements of the inverter 7 and also control signals for the regulator device 6. More precisely, the control device generates setpoint power values for each phase of the AC mains voltage as a function of the captured parameters in order to obtain the desired output-side alternating currents. The setpoint power values can be converted into a corresponding actuation pattern, for example in a pulse width modulation stage, with which actuation pattern the switch elements of the inverter are clocked in order to produce the desired alternating currents at the inverter output 12 after filtering. In principle, the inverter arrangement 3 functions in a conventional manner with line-coupled operation.

In order to monitor the availability of the supply grid 4 during operation of the plant 1, the inverter arrangement 3 according to the invention has an integrated monitoring device 19. The grid monitoring device 19 can be provided as an independent structural unit independently of the inverter 7 and its associated control device 9 and can be implemented using hardware and/or software. In the preferred embodiment of the invention illustrated here, the monitoring device 19 is preferably included as part of the control device 9, preferably as firmware logic in the control software of the inverter 7. It monitors the present operating state on the basis of the measurement signals provided by the sensor device 8 in order to identify a grid failure, for example a grid shutdown or fault.

As soon as a grid failure is identified, the inverter arrangement 3 should automatically disconnect itself from the grid 4 in order to avoid a further feed into the grid 4. A disconnecting device 21 which is connected to the monitoring device 19 is assigned for this purpose. The disconnecting device 21 has, in the preferred embodiment illustrated here, three switches 22, 23, 24, which are each integrated in one of the output lines 13, 14, 16 of the inverter 7, and a switch disconnector 26, which is arranged in the neutral conductor 18. As soon as the monitoring device 19 ascertains conditions which characterize a grid failure or unintentional island grid operation, it actuates the switches 22, 23, 24 and 26 in order to achieve galvanic isolation between the plant 1 and the grid.

Figure 2:
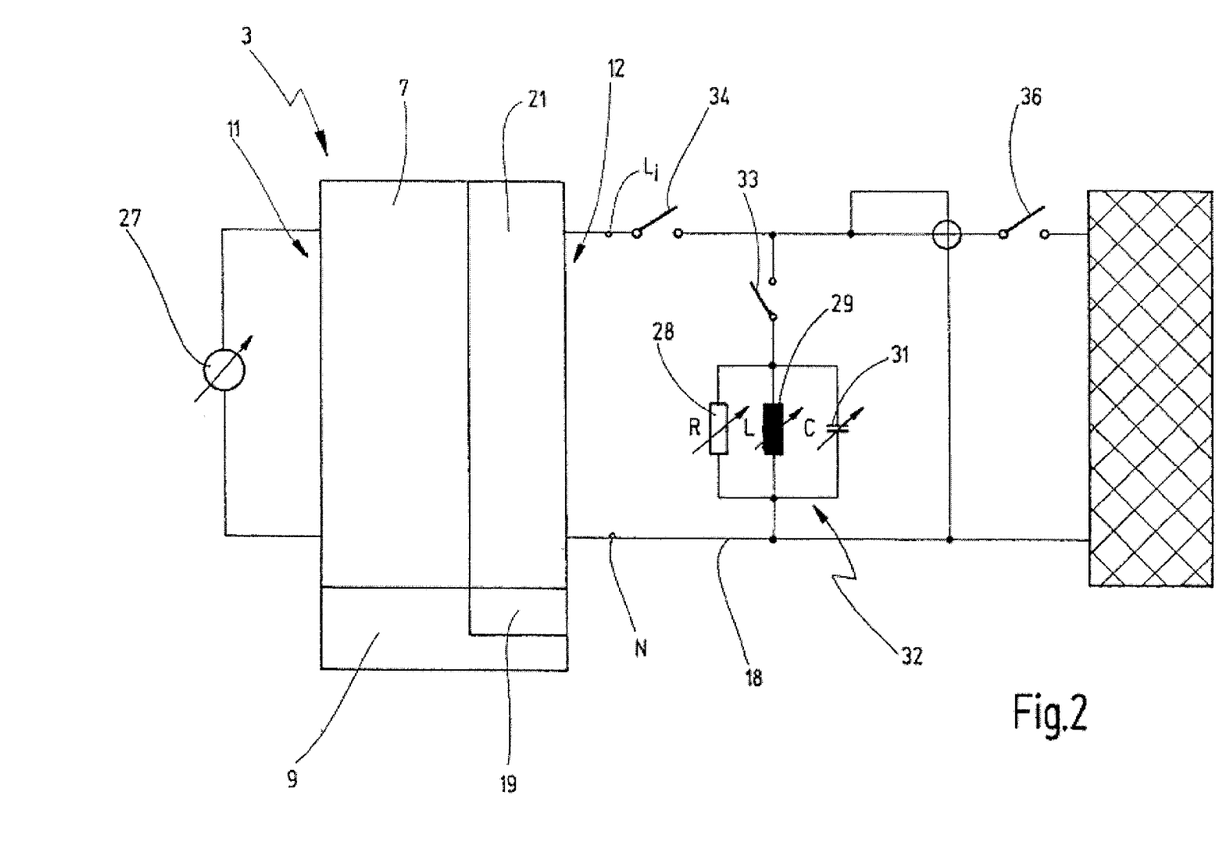
FIG. 2 shows a test circuit for checking the operation of a monitoring device for detecting an island network.

FIG. 2 illustrates, in slightly simplified form, a test circuit which can be used in accordance with the draft standard VDE 0126 for checking an inverter arrangement for disconnection as a result of unintentional island operation. The test circuit can simulate a corrected parallel feed or load state.

FIG. 2 illustrates the inverter arrangement 3 according to the invention with the inverter 7, the grid monitoring device 19 and the disconnecting device 21 integrated in the test circuit. The DC voltage side of the inverter 7 is supplied via a power source 27 that can be regulated. On the AC voltage side of the inverter 7, a resistor R 28, an inductor coil L 29 and a capacitor C 31 are connected in parallel with the output 12 and form an RLC resonant circuit 32. Although this is not illustrated in FIG. 2, a corresponding RLC resonant circuit 32 can be provided for each phase L1, L2 and L3, with this corresponding RLC resonant circuit being connected firstly to the neutral output connection 17 and secondly being connectable to the respective inverter output connection 13, 14 or 16 via a switch 33. In addition, switches 34, 36 are also connected between the inverter 7 and the RLC resonant circuit 32 or between the RLC resonant circuit 32 and the grid 4 or a suitable grid simulator.

The RLC resonant circuit is adjusted to the power source and the grid in such a way that it draws all of the generated active and reactive power and no power is output into the grid 4. The resistor R 28 is adjusted in order to consume all of the active power which is output by the inverter 7, while the fundamental of the LC parallel resonant circuit largely corresponds to the mains frequency.

During the test, all of the switches 32, 34 and 36 are initially closed and the inverter arrangement 3 is operated normally on the grid 4 or grid simulator. If the switch 36 is now opened in order to simulate a grid failure, in this case it may not be so easily possible to identify a grid failure merely by voltage and frequency monitoring. The LC resonant circuit 29, 31 continues to oscillate at the mains frequency and maintains this mains frequency even when the grid has been shut down. The resistor R consumes all of the generated active power. However, even under these conditions of so-called balanced loading, a grid failure needs to be identified safely and quickly, in any case in less than 5 seconds.

The grid monitoring device 19 according to the invention accomplishes this by means of special monitoring logic which will be explained below with reference to FIG. 3.

Figure 3:
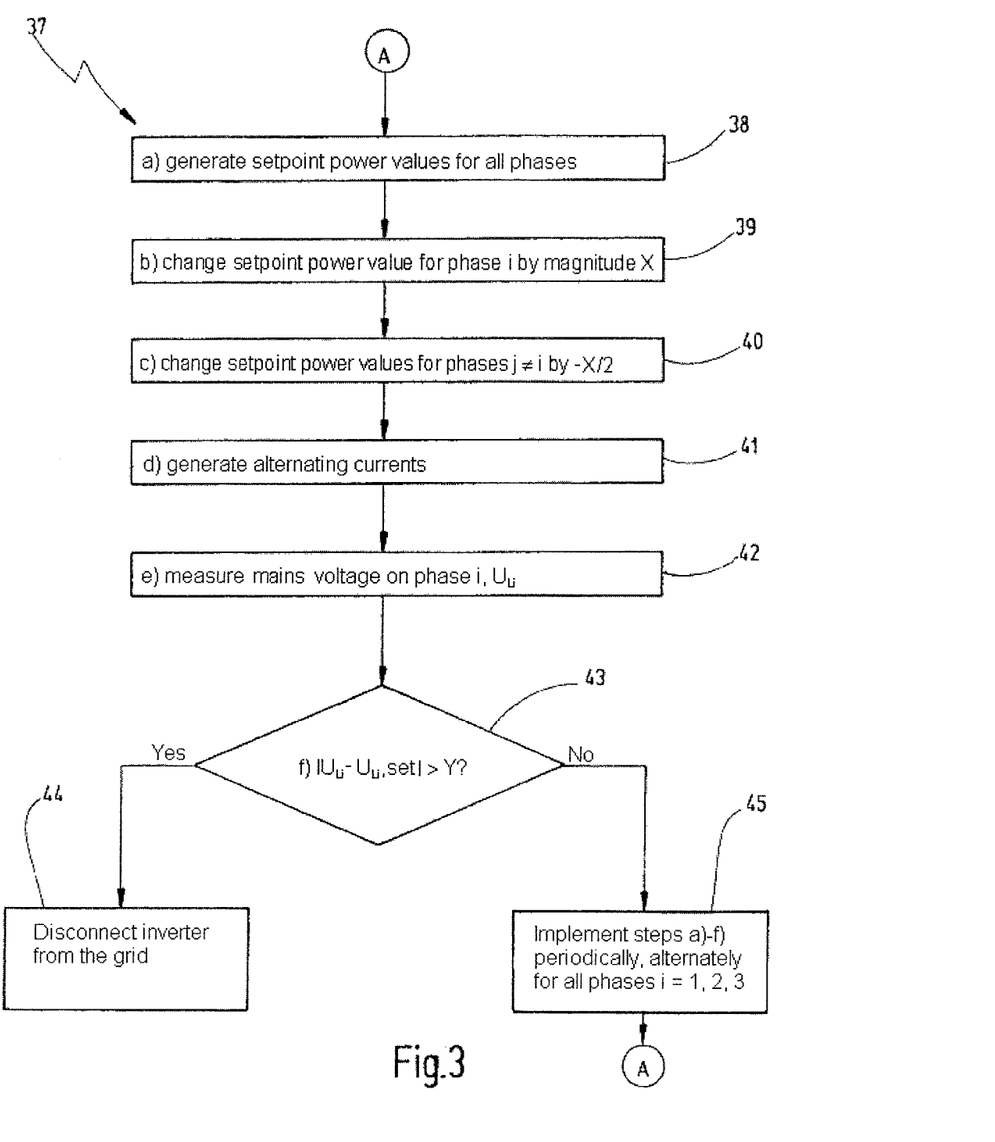
FIG. 3 shows a simplified flowchart of an embodiment of a method according to the invention for monitoring a power generation plant with respect to grid shutdown.

FIG. 3 illustrates a method 37 according to the invention for monitoring a decentralized power generation plant, in particular the photovoltaic system 1 according to the invention, for feeding into a three-phase grid, for example a public supply grid 4 of a power supply company, by means of an inverter 7 in order to identify a grid failure or a grid shutdown and to avoid unintentional island grid operation. The method 37 is implemented parallel to the normal operation of the power generation plant 1 periodically and alternately for all phases i=1, 2, 3, wherein the period is selected such that in any case a grid failure identification is ensured within the prescribed time, for example 5 seconds. The method begins with step 38, in which setpoint power values $P_{L1}$, $P_{L2}$, $P_{L3}$ for each phase of the AC mains voltage are generated in order to generate alternating currents which are matched to the amplitude, frequency and phase angle of the respective AC mains voltage (step 38).

Step 38 can comprise determination of a setpoint value for the total output-side AC power of the inverter 7, which is intended to be fed into the AC voltage grid 4, on the basis of the maximum generator power that can be drawn under current environmental and operating conditions, and division of the determined setpoint value for the total power by the number of phases of the AC voltage, in this case in particular 3. The generated AC power is then distributed uniformly among all phases.

In step 39, the setpoint power value for a certain phase i of the AC mains voltage is changed by a predetermined first magnitude X in a predetermined time period. By way of example, it is assumed that, for example, the setpoint power value $P_{L1}$ for the phase i=1 of the AC mains voltage is reduced by a first magnitude X=0.05 (5%) to 95%. The predetermined time period preferably corresponds to a period of the AC mains voltage and its beginning is synchronized with the zero crossing of the respective phase, in this case the phase 1 of the AC mains voltage.

In step 40, the setpoint power value for at least one of the other two phases j≠i of the AC mains voltage is changed by a predetermined second and/or third magnitude $Y_2$ and $Y_3$, respectively, in the same time period in the reverse direction, wherein the sum of the second and third magnitudes $Y_2+Y_3$ is equal in terms of absolute value to the first magnitude X. With reference to the above-cited example, the setpoint power values $P_{L2}$, $P_{L3}$ for the other two phases j=2, 3 can be changed, for example, with the same magnitude by $Y_2=Y_3=-X/2$, i.e. in this case increased by 2.5%. As a result, the reduction in the output power and therefore also the input power of the inverter 7 for the phase 1 is compensated for by an increase in the powers for the phases 2 and 3.

In step 41, the alternating currents at the inverter output connections 13, 14 and 16 are generated on the basis of the now changed setpoint power values $P_{L1}$, $P_{L2}$ and $P_{L3}$.

For this purpose, the alternating currents are preferably generated taking into consideration the current amplitude values of the phase voltages $U_{L1}$, $U_{L2}$, $U_{L3}$. For example, in one embodiment, a current regulator presets the desired setpoint alternating current value for the respective phase depending on the respective (changed) setpoint power value and the present actual phase voltage value, and an actuation device controls, for example, switching elements of an inverter bridge circuit (not illustrated in any more detail here) in a suitable manner in order to obtain the predetermined setpoint alternating current value for each phase.

The alternating currents are fed into the grid 4.

In step 42, the mains voltages are measured for all phases, but at least the amplitude of the mains voltage $U_{Li}$ for the relevant phase i in the predetermined time period.

In step 43, it is ascertained whether the measured amplitude of at least the one certain phase i of the AC mains voltage $U_{Li}$ has changed by more than a maximum permissible quantity Z with respect to the setpoint value $U_{Li,set}$. The maximum permissible quantity Z can be selected to be approximately equal to the first magnitude X. To this extent, in the above example, a check is performed, for example, to ascertain whether the amplitude of the mains voltage $U_{L1}$ has been reduced by approximately 5%.

If this is the case (yes in step 43), it is then identified in step 44 that a grid failure and therefore an unintentional island grid operation is present. Then, the inverter 7 is galvanically isolated from the grid 4 safely by switching the disconnecting device 21 by means of the control device 9.

If the amplitude of the AC mains voltage $U_{Li}$ has not changed by more than a maximum permissible quantity Z (no in step 43), it is identified that no undesired island grid operation is present, with the result that normal operation can be continued. In this case, the method is repeated after a certain time span for one of the other two phases j, for example phase 2. The time span is selected suitably in order to check all the phases at the right time in order to be able to identify an island grid operation on each phase in good time. For example, the time span can be approximately 10 periods, i.e. 200 ms at a mains frequency of 50 Hz.

After a further time span, for example after a further 10 periods of the AC mains voltage, the method 37 is implemented with its steps 38-43 for the third phase L3. As specified in block 45, steps 38-43 are therefore implemented repeatedly, periodically, alternately for all phases i=1, 2, 3 until no grid failure is ascertained.

The monitoring method according to the invention has numerous advantages. A grid failure is always safely identified. As long as the grid 4 is available and, with its low impedance in comparison with the inverter 7, forces the mains voltage on said inverter, the amplitude of the mains voltage for all phases remains approximately unchanged. In the event of a grid failure, however, owing to the modification of the setpoint power value for the one certain phase, the amplitude of the AC mains voltage on said phase changes, which is identified safely by the control device 9 on the basis of the measurement values of the sensor device 8. In the event of a reduction in the setpoint power value, the amplitude of the AC mains voltage for this phase is reduced approximately proportionally with respect thereto, for example. As a result, a safe shutdown criterion is provided.

Even in the case of a balanced load, i.e. an equilibrium between the generated power and the consumed power, the grid failure identification is unproblematic. In the case of the simulation shown in FIG. 2, for example, in the event of a reduction in the setpoint power value, the voltage across the resistor R 28 will remain the same as long as the grid is coupled. In the event of a grid shutdown by interruption of the switch 24, the voltage across the resistor R 28 decreases corresponding to the reduction in the sinusoidal setpoint power value. In this case, too, a grid failure or a grid shutdown is always safely identified.

Advantageously, by virtue of the fact that each phase is checked individually, the grid failure is also always identified in the case of a power equilibrium on only one single phase or on a plurality of phases.

By virtue of the corresponding increase/reduction in the setpoint power values for the other two phases j, the reduction/increase in the output power for the phase i and therefore a corresponding reduction in the input power of the inverter 7 is compensated for. Therefore, in total, summed over all of the phases, the same power is drawn from the photovoltaic generator 2 as in the case without the measure for detecting an island network. Owing to the fact that the DC voltage input power of the inverter 7 remains the same, the photovoltaic generator 2 can still be operated at its maximum power point, with the result that it is not necessary to endure any power losses. In addition, the inverter, in contrast to the other conventional methods, does not need to suffer from any losses of efficiency.

Within the scope of the invention, numerous modifications are possible. Thus, for example, the values for the first magnitude X, the second and third magnitudes $Y_2$, $Y_3$ and the quantity Z for the maximum permissible change in amplitude of the AC mains voltage can be ascertained in any desired suitable manner. If appropriate, they can be determined empirically for a respective plant 1 in situ in such a way that, firstly, considerations of the grid are minimized, but a grid failure is always safely identified.

In addition, it has been assumed in the above-explained specific example of the monitoring method 37 according to the invention that the two other phases j are both changed by the same magnitude $Y_2=Y_3=-X/2$. Instead, however, only one of the phases j could also be changed by a magnitude $Y_j$ equal to the first magnitude X, but in the reverse direction thereto. If, for example, the setpoint power value for the phase 1 is reduced by 5%, at the same time the setpoint power value for the phase 2 is increased by 5%, for example, while the setpoint power value for the phase 3 remains unchanged. By virtue of the additional measurement of the amplitude of the mains voltage for the phase 2 and comparison with the maximum permissible change quantity Z, grid failures for both phases, in this case 1 and 2, can then be identified simultaneously. After further time spans, the method 37 can then be repeated, with the result that the setpoint power values are modified periodically, alternately, in pairs for the phases 1, 2, then 2, 3, and then 1, 3. In comparison with the above procedure, in which only a single phase is monitored, the method 37 only needs to be implemented half as often, with the result that the phases are subject to an unbalanced load less often.

In the above exemplary embodiments of the method according to the invention, the setpoint power values are determined as such for all phases of the AC voltage and modified appropriately for the island grid operation identification. The corresponding setpoint values for the alternating currents for the respective phases are then determined on the basis of the current actual values of the phase voltages. Thus, a constant power withdrawal from the generator is ensured. In a simplified embodiment of the invention, it can be assumed that the amplitudes of the phase voltages are equivalent to one another. In this case, the setpoint alternating current values for the phases can also be directly preset as setpoint values characterizing power and can be modified appropriately for the island grid operation identification. This reduces the complexity involved in the implementation and execution of the method according to the invention.

In addition, another equivalent criterion can be used for the grid failure identification. For example, it is possible to determine the mains impedance on the respective phase instead of performing a direct comparison of the induced change in mains voltage with a maximum threshold value on the basis of the fed-in alternating current and the output-side AC voltage and to check the mains impedance or the change in mains impedance over time for permissible maximum values.

Furthermore, the plant 1 could be galvanically isolated from the grid 4 if a grid failure is identified, but not completely shut down, but switched over in order to feed other consumers or in order to charge a power store.

Figure 4:
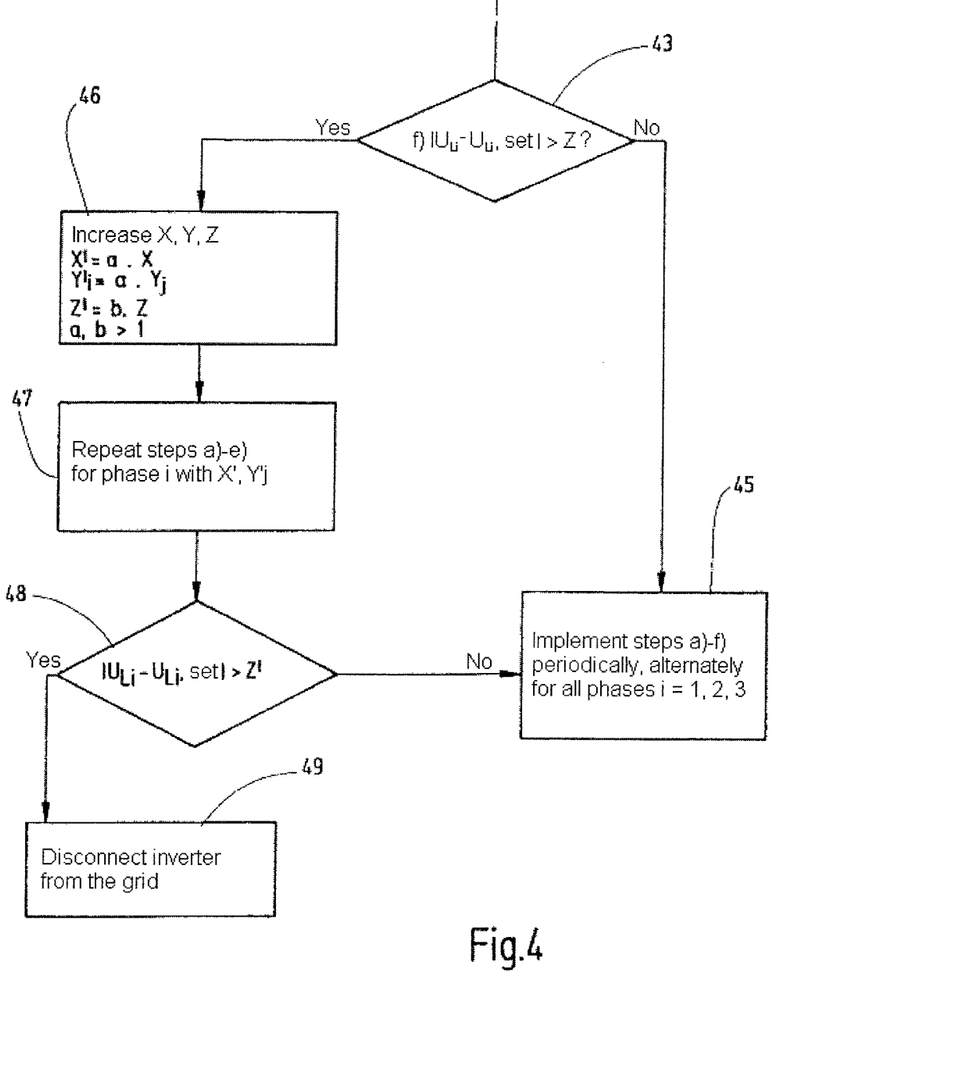
FIG. 4 shows a simplified flowchart of a modified embodiment of a method according to the invention for monitoring a power generation plant with respect to grid shutdown.

An advantageous development of the method 37 according to the invention is illustrated in FIG. 4. In this case, the method 37 is first implemented with the steps 38-43, as described in connection with FIG. 3. However, this takes place with reduced preset values for the magnitudes X, $Y_2$ and $Y_3$ and the maximum permissible quantity Z. For example, the setpoint power or current value for the phase i is reduced to 98%, with the result that the first magnitude X is 0.02. In the same time period, the setpoint power or current values for the phases 2 and 3 are each increased to 101%, with the result that $Y_2=Y_3=-X/2=-0.01$. Alternatively, the setpoint power or current value could also be increased by the same magnitude X for only one of the phases 2 or 3.

During the reduction, the amplitude of the mains voltage is measured for the phase 1 (and possibly also for the phase 2 or 3). If a change by approximately 2% is measured here, for example, after two periods (or 40 ms at a mains frequency of 50 Hz) the setpoint power or current value for the phase 1 is changed to a greater extent, i.e. reduced even more, for example. In FIG. 4, this is indicated after a positive result in the check in step 43 in block 47 by virtue of the fact that the quantities X, $Y_j$ and Z are increased, where:

$$X'=a \times X; Y'_j=a \times Y_j; Z'=b \times Z \text{ where } a,b>1.$$

Then, according to block 48, steps 38-42 of the method 37 are repeated with the increased values X', $Y'_j$. For example, the setpoint power or current value in phase 1 is reduced to 95% (X'=0.05), while the setpoint power or current values for the phases 2 and 3 are each increased to 102.5% ($Y'_2=Y'_3=-X/2=-0.025$).

During the reduction, the amplitude of the measurement voltage for the phase 1 is measured and checked to ascertain whether said amplitude does not exceed the maximum permissible quantity Z' (step 39). If a change in the mains voltage of approximately 5% (Z'=0.05) is measured, it is ascertained that a grid failure is present, with the result that, then in step 50, the inverter 7 is disconnected from the grid 4.

In the event of a negative result of the check in one of blocks 45 or 49, i.e. when there is an insufficiently large change in the mains voltage measured, the method 37 is implemented first with steps 38-43 and possibly with steps 47-49 for the other phases 2 and 3.

Figure 5:
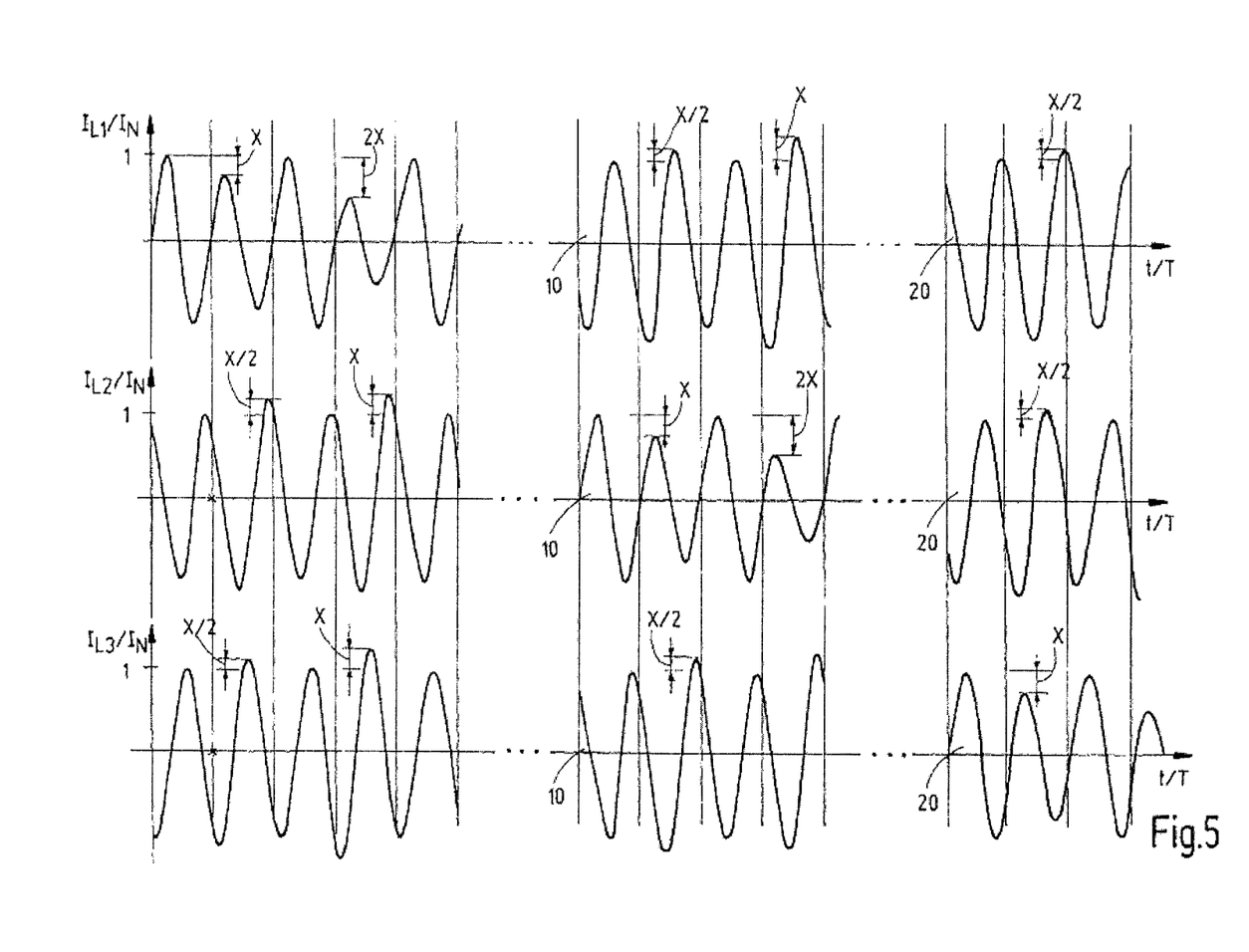
FIG. 5 shows timing diagrams of the alternating currents generated for illustrating the mode of operation of the method shown in FIGS. 3 and 4, in a very simplified illustration.

FIG. 5 shows a timing diagram which illustrates, in simplified form, the time sequence of the method according to the invention for monitoring a decentralized power generation plant in relation to a grid failure as shown in FIG. 4. In each case the sinusoidal setpoint current values for the alternating currents for the individual phases i=1, 2 and 3 are illustrated. For illustrative purposes, the changes in the setpoint current values for the individual phases are illustrated in exaggerated fashion in comparison with the respective setpoint values.

The advantage of the embodiment of the method 37 according to the invention shown in FIGS. 4 and 5 in comparison with that shown in FIG. 3 consists in particular in that, in the first run, the changes in current are relatively small, which results in low levels of influencing the grid 4 and little generation of flicker on the grid. Only when it is ascertained in the first run that there is a high probability of there being a grid failure, the criteria are tightened by virtue of the magnitudes X, $Y_j$, Z being increased in order to verify the grid failure with a high level of identification safety. Since this represents the exception case, discrepancies between the fed-in power and the rated power, i.e. unbalanced loads and flicker, can be reduced to a minimum.

The invention discloses a device and a method for monitoring a decentralized power generation plant for feeding into a three-phase grid for preventing an unintentional island grid operation, wherein the power generation plant 1 has an inverter 7, which generates three alternating currents which are phase-shifted with respect to one another from an input-side DC voltage, in particular of a photovoltaic generator, which alternating currents are fed into the grid 4. The monitoring method is based on the fact that, for a predetermined time period, the setpoint power value for a certain phase of AC mains voltage is changed, for example reduced, by a predetermined first magnitude X, while the setpoint power values for the other two phases are changed in the reverse direction, for example increased, by a predetermined second and/or third magnitude $Y_2$, $Y_3$. In this case, the sum of the second and third magnitudes $Y_2$, $Y_3$ is equal to the first magnitude. If a change in the amplitude of the AC mains voltage in comparison with the rated value for the one certain phase which is greater than a preset threshold value is identified, an unintentional island grid operation is ascertained, and the plant 1 is disconnected from the grid 4. The monitoring can be performed largely without any power and efficiency losses and with a reduced unbalanced load.

The invention claimed is:

1. A method for monitoring a decentralized power generation plant for feeding into a three-phase grid comprising an inverter, which generates alternating currents which are phase-shifted with respect to one another from an input-side DC voltage, said alternating currents being fed into the grid, wherein the method comprises:
   a) generating a setpoint power value for each phase of an AC mains voltage, with the result that each generated alternating current is matched to an amplitude, frequency and phase angle of a respective phase of the AC mains voltage;

b) changing the setpoint power value for a certain phase of the AC mains voltage by a predetermined first magnitude in a predetermined time period;

c) changing, in the reverse direction, the setpoint power value for at least one of the other phases of the AC mains voltage by a predetermined second and/or third magnitude in the same predetermined time period, with the result that the sum of the second magnitude and the third magnitude is equal to the first magnitude;

d) generating the alternating currents by means of the inverter on the basis of the changed setpoint power values;

e) measuring the amplitude of at least the one certain phase of the AC mains voltage in the predetermined time period; and f) ascertaining if the measured amplitude of at least the one certain phase of the AC mains voltage changes by more than a maximum permissible quantity.

2. The method as claimed in claim 1, wherein the power generation plant is a photovoltaic system, which has a photovoltaic generator, which supplies a DC voltage input power for the inverter.

3. The method as claimed in claim 2, wherein the photovoltaic generator is operated at its individual maximum power point in order to provide the maximum DC voltage input power for the inverter given a current environmental conditions.

4. The method as claimed in claim 2, wherein the step d) of generating the alternating currents using the inverter on the basis of the changed setpoint power values comprises determining setpoint values for the alternating currents of the phases on the basis of the setpoint power values taking into consideration the current actual values for the respective AC phase voltages and actuating the inverter in order to achieve these alternating currents.

5. The method as claimed in claim 2, wherein the step d) of generating the alternating currents comprises determining setpoint values for the alternating currents of the phases assuming that the amplitudes of the phase voltages are equal, and actuating the inverter in order to achieve these alternating currents.

6. The method as claimed in claim 1, wherein the step d) of generating the alternating currents using the inverter on the basis of the changed setpoint power values comprises determining setpoint values for the alternating currents of the phases on the basis of the setpoint power values taking into consideration the current actual values for the respective AC phase voltages and actuating the inverter in order to achieve these alternating currents.

7. The method as claimed in claim 1, wherein the step d) of generating the alternating currents comprises determining setpoint values for the alternating currents of the phases assuming that the amplitudes of the phase voltages are equal, and actuating the inverter in order to achieve these alternating currents.

8. The method as claimed in claim 1, wherein the step b) of changing the setpoint power value for a certain phase of the AC mains voltage comprises reducing the setpoint power value, and step c) of changing, in the reverse direction, the setpoint power value for at least one of the other phases of the AC mains voltage comprises increasing the setpoint power value.

9. The method as claimed in claim 1, wherein the step c) of changing, in the reverse direction, the setpoint power value for at least one of the other phases of the AC mains voltage by the predetermined second magnitude and/or third magnitude comprises that the setpoint power value for each of the other two phases is changed by a second or third magnitude.

10. The method as claimed in claim 9, wherein the second and the third magnitudes are equal and each correspond to half the absolute value of the first magnitude.

11. The method as claimed in claim 1, wherein the step c) of changing, in the reverse direction, the setpoint power value for at least one of the other phases of the AC mains voltage by the predetermined second and/or third magnitude comprises that the setpoint power value for only one of the other two phases is changed by a second magnitude, which corresponds to the first magnitude, the setpoint power value for the further of the other two phases remaining unchanged.

12. The method as claimed in claim 11, wherein the steps e) of measuring the amplitude of the phase of the AC mains voltage and f) of ascertaining if the measured amplitude has changed by more than the maximum permissible quantity are implemented simultaneously even for that one of the other two phases whose setpoint power value is changed by the second magnitude.

13. The method as claimed in claim 1, wherein the predetermined time period corresponds to a period of the AC mains voltage, and wherein the beginning of the predetermined time period is synchronized with the zero crossing of the one certain phase of the AC mains voltage.

14. The method as claimed in claim 1, wherein the maximum permissible quantity for the change in the amplitude of at least the one certain phase of the AC mains voltage approximately corresponds to the first magnitude.

15. The method as claimed in claim 1, wherein, in the case where it is ascertained in step f) that at least one measured amplitude has changed by more than the maximum permissible quantity, the power generation plant is automatically disconnected from the grid.

16. The method as claimed in claim 1, wherein, in the case where it is ascertained in step f) that at least one measured amplitude has changed by more than the maximum permissible quantity, steps a) to f) are repeated after a further time period with increased preset values for the predetermined first magnitude, the predetermined second magnitude or third magnitude and the maximum permissible quantity or quantities.

17. The method as claimed in claim 16, wherein the power generation plant is automatically disconnected from the grid if it is ascertained that at least one amplitude of a phase of the AC mains voltage has changed by more than the increased maximum permissible quantity.

18. The method as claimed in claim 16, wherein the increased preset values are at least approximately twice as high as the predetermined values in the first run of the steps a) to f).

19. The method as claimed in claim 1, wherein the method is repeated periodically and alternately for each of the three phases of the AC mains voltage as the certain phase.

20. The decentralized power generation plant for feeding into the three-phase grid, in particular a photovoltaic system for feeding into a power supply grid, comprising the three-phase inverter, which converts the input-side DC voltage, in particular of a photovoltaic generator, into three alternating currents which are phase-shifted with respect to one another and which are fed into the grid, wherein the power generation plant further comprises:
    a regulator device for regulating the power fed into the inverter to obtain a current maximum power value;
    a sensor device for capturing operational parameters of the power generation plant;

a disconnecting device for disconnecting the power generation plant from the grid, and connecting the power generation plant to the grid; and a control device, which is connected to the regulator device, the sensor device and the disconnecting device, for controlling the operation of the inverter, wherein the control device comprises a logic for implementing the method as claimed in claim 1 and, if necessary, induces the disconnecting device to disconnect the power generation plant from the grid.

* * * * *